(12) United States Patent
Neff

(10) Patent No.: US 10,576,891 B2
(45) Date of Patent: Mar. 3, 2020

(54) METHOD, APPARATUS, COMPUTER PROGRAM AND COMPUTER PROGRAM PRODUCT FOR TRANSMITTING IMAGE DATA

(71) Applicant: Bayerische Motoren Werke Aktiengesellschaft, Munich (DE)

(72) Inventor: Albrecht Neff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 14/554,663

(22) Filed: Nov. 26, 2014

(65) Prior Publication Data

US 2015/0156439 A1  Jun. 4, 2015

(30) Foreign Application Priority Data

Nov. 29, 2013 (DE) ................. 10 2013 224 539

(51) Int. Cl.
*H04N 9/47* (2006.01)
*B60R 1/00* (2006.01)
(Continued)

(52) U.S. Cl.
CPC ........... *B60R 1/00* (2013.01); *H04N 5/23203* (2013.01); *H04N 5/247* (2013.01); *H04N 7/181* (2013.01); *B60R 2300/40* (2013.01)

(58) Field of Classification Search
CPC ......... G06T 7/0018; B60R 1/00; B60R 1/002; B60R 2300/105; B60R 2300/30; B60R 2300/607; B60R 11/02; B60R 11/0211; B60R 2011/0052; B60R 2300/302; B60R 2300/303; B60R 2300/304; B60R 2300/305; B60R 2300/307; B60R 2300/402; B60R 2300/802; B60R 2300/806; B60R 2300/8066
(Continued)

(56) References Cited

U.S. PATENT DOCUMENTS

| 6,553,131 B1 | 4/2003 | Neubauer et al. |
| 2003/0041329 A1* | 2/2003 | Bassett .................. H04N 7/185 725/105 |

(Continued)

FOREIGN PATENT DOCUMENTS

| DE | 600 30 377 T2 | 9/2007 |
| DE | 10 2010 030 068 A1 | 12/2011 |

(Continued)

OTHER PUBLICATIONS

German Search Report dated Mar. 25, 2014, with Statement of Relevancy (Five (5) sheets).

*Primary Examiner* — Masum Billah
(74) *Attorney, Agent, or Firm* — Crowell & Moring LLP

(57) ABSTRACT

In a method for transmitting image data from a plurality of cameras in a vehicle, a set of functions is provided, which set of functions comprises a plurality of functions each having a requirement for a respective image setting of at least one of the cameras. If a function is activated, a respective image setting is set for at least one of the cameras on the basis of at least one of the function and a respective predefined desired data rate during image data transmission in order to provide the image data from the respective camera for the respective function.

15 Claims, 2 Drawing Sheets

(51) Int. Cl.
*H04N 5/232* (2006.01)
*H04N 5/247* (2006.01)
*H04N 7/18* (2006.01)

(58) Field of Classification Search
USPC .......................................................... 348/148
See application file for complete search history.

(56) References Cited

U.S. PATENT DOCUMENTS

| | | | | |
|---|---|---|---|---|
| 2009/0179773 A1* | 7/2009 | Denny | ...................... | G06T 7/80 340/901 |
| 2011/0175752 A1* | 7/2011 | Augst | ........................ | B60R 1/00 340/905 |
| 2011/0273310 A1* | 11/2011 | Kadowaki | .......... | B62D 15/0285 340/932.2 |
| 2012/0162374 A1* | 6/2012 | Markas | .............. | H04N 13/0221 348/46 |
| 2014/0313409 A1* | 10/2014 | Schramm | ................ | G09G 5/026 348/441 |
| 2014/0320658 A1* | 10/2014 | Pliefke | .................... | B60R 1/002 348/148 |
| 2015/0271493 A1* | 9/2015 | Okazaki | .............. | H04N 5/23206 348/211.11 |
| 2016/0007026 A1* | 1/2016 | Dong | ................... | H04N 19/176 375/240.08 |

FOREIGN PATENT DOCUMENTS

| | | | | |
|---|---|---|---|---|
| DE | 102010030068 A1 | * | 12/2011 | ............... B60R 1/00 |
| DE | 10 2010 055 156 A1 | | 6/2012 | |
| DE | 102010055156 A1 | * | 6/2012 | ............. H04N 7/181 |
| DE | 10 2012 005 400 A1 | | 9/2013 | |
| DE | 10 2012 204 175 A1 | | 9/2013 | |
| EP | 2 466 889 A2 | | 6/2012 | |

* cited by examiner

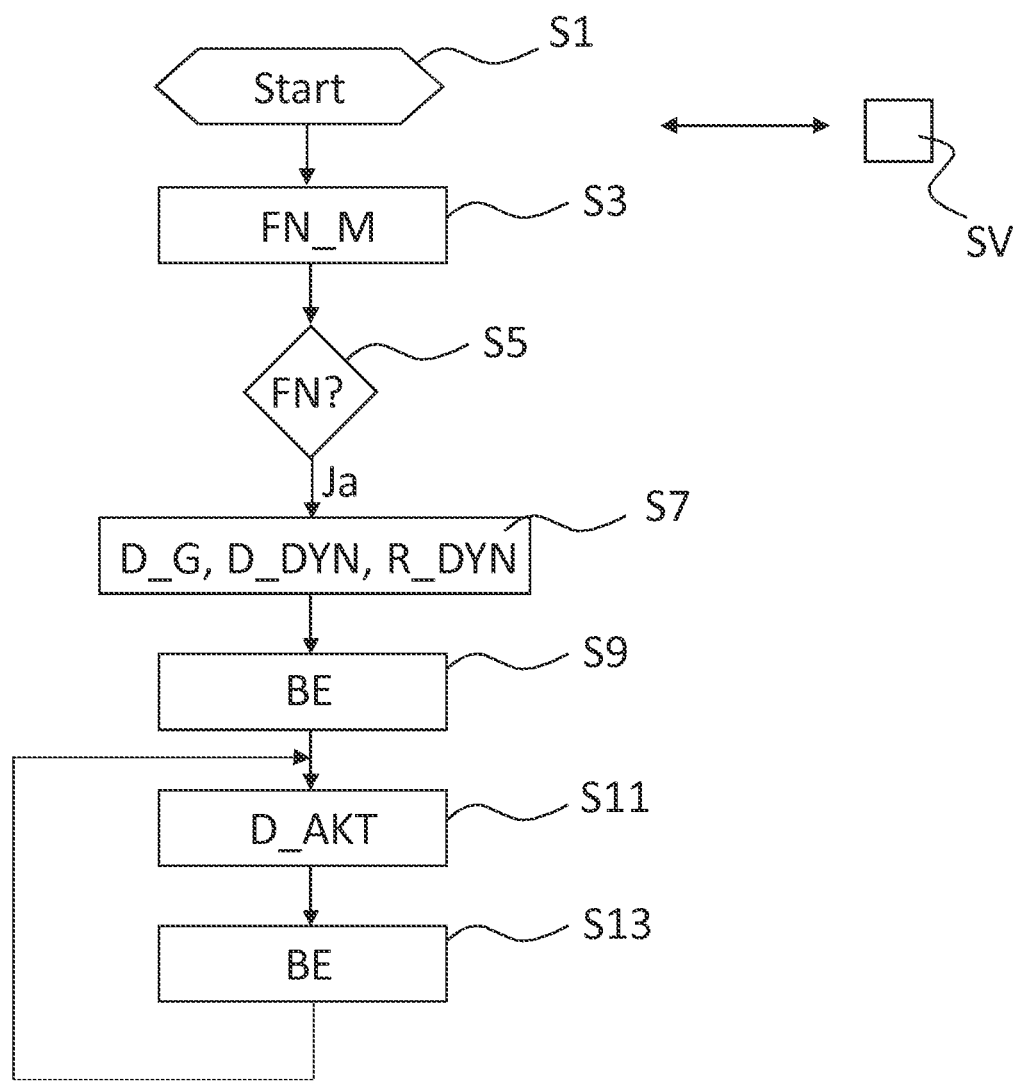

METHOD, APPARATUS, COMPUTER PROGRAM AND COMPUTER PROGRAM PRODUCT FOR TRANSMITTING IMAGE DATA

CROSS REFERENCE TO RELATED APPLICATION

This application which claims priority under 35 U.S.C. § 119 from German Patent Application No. 10 2013 224 539.4, filed Nov. 29, 2013, the entire disclosure of which is herein expressly incorporated by reference,

BACKGROUND AND SUMMARY OF THE INVENTION

The invention relates to a method for transmitting image data from a plurality of cameras in a vehicle. The invention also relates to an apparatus for transmitting image data, Furthermore, the invention relates to a computer program and a computer program product for transmitting image data.

Modern cameras produce greater and greater amounts of data. Furthermore, more and ore cameras are installed in modern vehicles, Greater and greater amounts of data produced by cameras therefore arise in modern vehicles.

The object on which the invention is based is to provide a method and a corresponding apparatus which contributes to efficiently transmitting image data from a plurality of cameras in a vehicle.

The object is achieved by the features of the independent patent claims. Advantageous refinements are indicated in the subclaims.

The invention is distinguished by a method for transmitting image data from a plurality of cameras in a vehicle. Furthermore, the invention is distinguished by a corresponding apparatus for transmitting image data from a plurality of cameras in the vehicle. A set of functions is provided, which set of functions comprises a plurality of functions. The functions each have a requirement for a respective image setting of at least one of the cameras. If a function is activated, a respective image setting is set for at least one of the cameras on the basis of the function. The respective image setting is set on the basis of a respective predefined desired data rate during image data transmission in order to provide the image data from the respective camera for the respective function.

The functions in the set of functions are distinguished, in particular, by the fact that they require image data from at least one of the cameras. Such functions are, for example, lane detection and/or a display of a view predefined by a customer in a parking function and/or object and/or obstacle and/or traffic sign detection.

The respective function is at least indirectly provided with the image data, For example, the image data may also first be preprocessed and the respective function can then be provided with the preprocessed data.

The image setting comprises, for example, a setting of the images per second which are recorded by the respective camera. Alternatively or additionally, the image setting comprises a setting of the color depth and/or a setting of the type of compression and/or compression rate and/or a setting of the resolution. Alternatively or additionally, the image setting comprises, for example, whether only one of a plurality of images from the respective camera is transmitted in a high quality and the other images of the plurality of images are transmitted in a lower quality.

The predefined desired data rate is distinguished, for example, by the fact that it makes it possible to transmit image data which are of such high quality that the requirement of the activated function can be met. Furthermore, the predefined desired data rate is distinguished, in particular, by the fact that it is as low as possible in this case.

This contributes to the image data from the respective camera being transmitted in a very efficient manner since the respective requirement of the respective active function can be met using the image data, but no additional, unnecessary data are transmitted at the same time.

According to one advantageous refinement, the respective image setting of the respective camera is set on the basis of the respective requirement of the function.

Therefore, when setting the image setting, it is taken into account, in particular, whether the function requires, for example, a predefined number of images per second and/or a predefined color depth and/or a predefined setting of the type of compression and/or compression rate and/or a predefined setting of the resolution. This possibly makes it possible to ensure that the functionality of the function is ensured with a data rate which is as low as possible.

According to another advantageous refinement, the respective image setting of the respective camera is set on the basis of a respective dynamically available data rate.

If for example, the camera is connected to a universal bus and/or a universal network, data which do not come from the respective camera and dynamically restrict the available data rate can also be transmitted via the bus and/or the network. For example, it is possible to dynamically restrict the available data rate for a desired audio transmission. By virtue of the fact that the dynamically available data rate is taken into account in the image setting, it is possible to prevent the bus and/or the network from being overloaded, for example.

According to another advantageous refinement, the respective image setting of the respective camera is set on the basis of a respective dynamically available computing capacity.

A computing unit which processes the image data can be used universally, for example, and can therefore have dynamically available computing capacities. By virtue of the fact that the dynamically available computing capacity of the computing unit is taken into account, it is possible to prevent the computing unit from possibly being overloaded.

According to another advantageous refinement, the respective requirement of the plurality of functions for the respective image setting is dynamic.

The respective requirement of the plurality of functions for the respective image setting changes on the basis of a vehicle state, for example. The vehicle state comprises, for example, a steering lock and/or forward travel of the vehicle and/or reverse travel of the vehicle and/or indicating of the vehicle. If the vehicle state changes, a different requirement is possibly imposed on the respective image setting, For example, a higher image quality may be required from a rear camera of the vehicle when engaging the reverse gear and a higher image quality may be required from a camera arranged on a left-hand side of the vehicle when turning left. The change in the respective requirement can be taken into account when setting the respective image setting by means of dynamic requirements.

According to another advantageous refinement, if a function is activated, a respective image setting of a plurality of the cameras is set on the basis of the function, to be precise on the basis of the respective predefined desired data rate during image data transmission in order to provide the image data from the respective camera for the respective function.

For example, it is possible that, although the activated function requires only image data from one of the cameras, very high-resolution images from this camera are required fur this purpose. If some of the cameras or all cameras are connected to the same bus and/or to the same network in this case, for example, the respective image setting of the remaining cameras or of some of the remaining cameras can be set in such a manner that the respective data rate of the cameras not required for this function is reduced. This reduces a total data rate of the cameras connected to the same bus and/or to the same network, with the result that more bandwidth is in turn available for the camera from which high-resolution images are required.

According to another advantageous refinement, a respective current data rate of the respective camera is determined. The image setting is adapted on the basis of the respective current data rate and on the basis of the respective predefined desired data rate during image data transmission in order to provide the image data from the respective camera for the respective function.

The data rate produced depends greatly on an image to be recorded. In particular, if compressed image data are transmitted, the data rate greatly depends, for example, on how high the frequency of the image to be recorded is and/or on how many different frequencies the image to be recorded has. For this reason, it is possible, for example, for the current data rate to differ greatly from the predefined desired data rate. By virtue of the fact that the current data rate is checked, the image settings can possibly be newly adapted in order to therefore comply with the predefined desired data rate as accurately as possible.

According to another advantageous refinement, a respective current data rate of the respective camera is determined. The image setting of the respective camera is gradually adapted on the basis of the respective current data rate and on the basis of the respective predefined desired data rate during image data transmission in order to provide the image data from the respective camera for the respective function starting from a predefined starting data rate which is lower than the predefined desired data rate.

As already described, the current data rate respectively depends on the image to be recorded. Gradually approaching the predefined desired data rate makes it possible to very reliably avoid the predefined desired data rate being exceeded. This makes it possible to avoid the computing unit and/or the network and/or the bus being overloaded if the current data rate differs greatly from the desired data rate.

According to another advantageous refinement, a weighting is respectively assigned to the functions in the set of functions. If a plurality of functions are activated at the same time, the image setting of the respective camera is set on the basis of the respective weighting.

On account of a technically determined maximum data rate, not all active functions may possibly be accomplished at the same time, for example. A weighting makes it possible to assign a higher weighting to safety-critical functions, in particular, than convenience functions, for example. It is therefore possible to contribute to the safety-critical functions being accomplished earlier than other functions, for example.

According to another aspect, the invention is distinguished by a computer program for transmitting image data, the computer program being designed to carry out the method for transmitting image data from a plurality of cameras in a vehicle or an advantageous refinement of the method in a data processing apparatus.

According to another aspect, the invention is distinguished by a computer program product comprising executable program code, the program code carrying out the method for transmitting image data from a plurality of cameras in a vehicle or an advantageous refinement of the method when executed by a data processing apparatus.

The computer program product comprises, in particular, a medium which can be read by the data processing apparatus and stores the program code.

The invention can be advantageously used, in particular, in a vehicle, for example in a motor vehicle such as an automobile, a truck or a motorcycle. In this case, the vehicle may comprise a corresponding camera arrangement and/or a corresponding apparatus for transmitting image data and/or a corresponding computer program product for transmitting image data.

Exemplary embodiments are explained in more detail below using the schematic drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a flowchart tier transmitting image data.

DETAILED DESCRIPTION OF THE DRAWINGS

Figure 1:
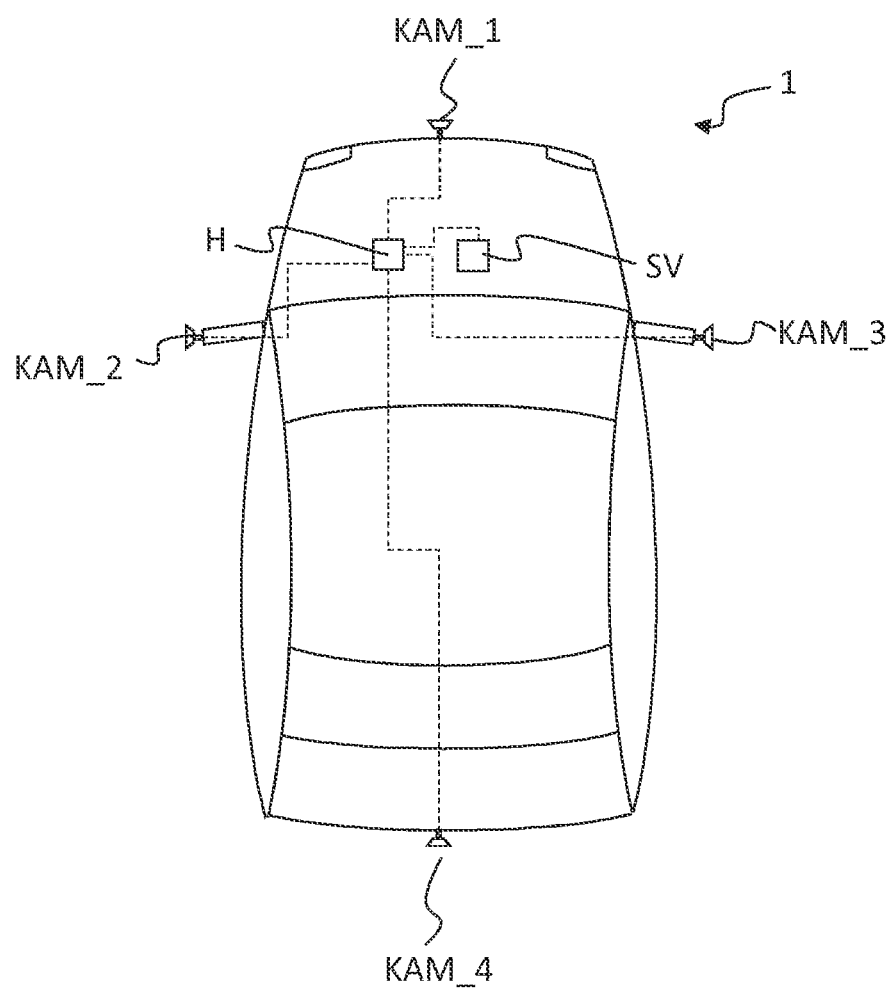
FIG. 1 shows a vehicle having a plurality of cameras.

FIG. 1 shows a vehicle 1. The vehicle 1 has a plurality of cameras KAM_1-KAM_4, for example a first camera KAM_1 which is arranged on the front of a vehicle, a second camera KAM_2 which is arranged on a side mirror of the vehicle 1, a third camera KAM_3 which is arranged on a further side mirror of the vehicle 1, and a fourth camera KAM_4 which is arranged on the rear of the vehicle I. The plurality of cameras KAM_1-KAM_4 are, for example, network cameras which are connected to a network node H.

The network node H comprises, for example, a hub which is designed to connect network nodes in a star shape, in particular to connect the cameras KAM_1-KAM_4 and computing units to one another, for example by means of an Ethernet, in particular according to IEEE-802.3. Ethernet is a technology which specifies software, for example protocols, and hardware, for example cables, distributors, network cards, for wired data networks.

The vehicle 1 additionally has a control apparatus SV which is connected to the network node H. The control apparatus SV has, for example, a data and program memory and a computing unit. The data and program memory and/or the computing unit can be formed in one structural unit and/or may be distributed among two or more structural units.

The control apparatus SV is designed to transmit control commands to the respective camera KAM_1-KAM_4 using the connection via the network node H to the cameras KAM_1-KAM_4 or using a direct connection to the cameras KAM_1-KAM_4 in order to set image settings of the respective camera KAM_1-KAM_4, as described in more detail below.

The control apparatus SV may also be referred to as an apparatus for transmitting image data.

In particular, the data and program memory control apparatus SV stores a program which is explained in more detail below using the flowchart in FIG. 2.

The program is started in a step S1 in which variables are initialized, for example.

A set of functions FN_M is provided in a step S3. The set of functions FN_M comprises a plurality of functions FN each having a requirement for a respective image setting BE of at least one of the cameras KAM_1-KAM_4. The set of functions FN_M is stored, for example, in the data and program memory of the control apparatus SV.

The respective requirement of the plurality of functions FN for the respective image setting BE is dynamic, for example. The respective requirement of the plurality of functions FN for the respective image setting BE changes on the basis of a vehicle state, for example. The vehicle state comprises, for example, a steering lock and/or forward travel of the vehicle and/or reverse travel of the vehicle and/or indicating of the vehicle.

Such functions FN comprise, for example, a lane detection function and/or a function for displaying a camera image on an image display unit in the vehicle 1, fix example for a view predefined by a customer in a parking function. Alternatively or additionally, the functions FN comprise a function for detecting objects and/or obstacles and/or traffic signs and/or a function for detailed object recognition if another sensor, for example a radar or ultrasonic sensor, has detected an object in a particular image area, for example.

The image setting BE comprises, for example, a setting of the images per second and/or a setting of the color depth and/or a setting of the type of compression and/or compression rate and/or a setting of the resolution. Alternatively or additionally, the image setting BE also comprises, for example, a setting regarding whether only every nth it age is intended to be transmitted in a high quality. In the case of four cameras KAM_1-KAM_4, for example, one of the cameras may each in turn transmit a high-quality image and the three remaining cameras may transmit a low-quality image. Alternatively or additionally, the image setting BE comprises, for example, whether only a partial image area is intended to be recorded with high quality since some functions FN possibly require only partial image areas. For example, a lane detection function possibly requires only a lower half of the image.

In a step S5, a check is carried out in order to determine whether a function FN is activated. If a function FN has been activated, the program is continued in a step S7.

A predefined desired data rate D_G is provided in step S7. The predefined desired data rate D_G is distinguished by the fact that it makes it possible to transmit image data which are of such high quality that the requirement of the activated function FN can be met. Furthermore, the predefined desired data rate D_G is distinguished, in particular, by the fact that it is as low as possible in this case. For this purpose, the matter of which requirement is associated with which likely data rate change is stored, in particular, for all functions FN in the set of functions FN_M. This is stored, for example, in a database stored in the data and program memory of the control apparatus SV. Furthermore, a respective assignment of functions FN to sources may be stored in the database since respective sources possibly impose different requirements on the image setting BE of the respective camera KAM_1-KAM_4.

Since the cameras KAM_1-KAM_4 are connected to a universal bus or universal network, for example, data which do not come from the respective camera KAM_1-KAM_4 and dynamically restrict an available data rate D_DYN may possibly also be transmitted via the bus and/or the network. For example, the available data ate D_DYN can be dynamically restricted for a desired audio transmission. Therefore, the dynamically available data rate D_DYN is alternatively or additionally determined and provided in step S7. The dynamically available data rate D_DYN results, in particular, from subtracting a restrictive data rate from a predefined maximum data rate which is technically determined, for example, and is stored in the data and program memory of the control apparatus SV, for example.

Since a computing unit which processes the transmitted image data, for example the computing unit of the control apparatus SV and/or a further computing unit, can also be universally used, a respectively available computing capacity R_DYN can dynamically change. Therefore, the dynamically available computing capacity R_DYN is alternatively or additionally determined and provided in step S7. The dynamically available computing capacity R_DYN results, in particular, from subtracting a restrictive computing capacity which is needed to calculate non-image data, from a predefined maximum computing capacity which is technically determined, for example, and is stored in the data and program memory of the control apparatus SV, for example.

In a step S9, an image setting BE is set for at least one of the cameras KAM_1-KAM_4, to be precise on the basis of the activated function FN and/or on the basis of the respective predefined desired data rate D_G and/or on the basis of the dynamically available data rate D_DYN and/or on the basis of the dynamically available computing capacity R_DYN.

The image setting BE of the respective camera KAM_1-KAM_4 is set, in particular, in such a manner that a data rate which results from the transmission of the image data from the respective camera KAM_1-KAM_4 is as low as possible and the image quality of the image data is simultaneously distinguished by the fact that the respective activated function FN can be accomplished.

The image setting BE of the respective camera KAM_1-KAM_4 is alternatively or additionally set on the basis of the respective requirement of the activated function FN, for example.

In a step S11, a respective current data rate D_AKT of the respective camera KAM_1-KAM_4 is determined.

In a step S13, the image setting BE of the respective camera KAM_1-KAM_4 is adapted on the basis of the respective current data rate D_AKT and on the basis of the predefined desired data rate D_G and/or the dynamically available data rate D_DYN and/or the dynamically available computing capacity R_DYN.

The image setting BE of the respective camera KAM_1-KAM_4 is adapted in step S13, in particular gradually, starting from a predefined starting data rate which is lower than the predefined desired data rate D_G.

The program is then continued in step S11. Steps S11 to S13 are carried out, in particular, as long as the respective function FN is active. The program is then ended.

A respective weighting is assigned to the functions FN in the set of functions FN-M, in particular.

Alternatively or additionally, a plurality of functions FN can be activated at the same time, for example. If this is the case, the image setting BE of the respective camera KAM_1-KAM_4 is additionally set in step S9 and/or in step S13, in particular, on the basis of the respective weighting, with the result that functions FN with a high weighting are taken into account earlier than functions EN with a low weighting.

Alternatively or additionally, a respective image setting of a plurality of the cameras KAM_1-KAM_4 is set in step S9 and/or in step S13. If some of the cameras KAM_1-KAM_4 or all cameras KAM_1-KAM_4 are connected to the same bus and/or to the same network, this makes it possible, for example, to reduce a total data rate produced by some of the cameras KAM_1-KAM_4 or by all cameras KAM_1-KAM_4.

Alternatively, the program can be ended after step S9.

The procedure explained may contribute to the image data from the respective camera KAM_1-KAM_4 being transmitted in a very efficient manner since the respective active function FN can be accomplished using the image data, but no additional, unnecessary data are transmitted at the same time.

In the above-described method or control sequence, one or more elements of a multipart policy can be implemented with the following properties:

Part 1 of the policy:

This part of the policy contains which requirements are imposed on which image data source by which function requiring image data or by which data sink. A plurality of elements may be provided in this case, for example:

requirements with regard to the image rate (recorded or transmitted images per second),
  requirements with regard to compression artifacts in the overall image,
  requirements for color depth,
  requirements with regard to compression artifacts in sections of the image (for example in the section of a lower half of the image in which the road surface can be seen, or in the section of a right-hand half of the image in which traffic signs are typically presented),
  requirements with regard to the image resolution,
  requirements for the maximum data rate.

Part 2 of the policy:

This part of the policy records which requirement is associated with which likely data rate change.

Part 3 of the policy:

This part of the policy records whether the respective predefined or set quality requirements or quality parameters are imposed on each individual image of the images required from a data sink, for example from a detection algorithm for pedestrians, at a predefined image rate of 30 images per second, for example, or whether it is sufficient for the data sink to obtain only every nth image of the 30 images per second from a camera in a particularly high quality, for example in a predefined high resolution, and to obtain the remaining images in poorer quality, for example in a predefined lower resolution. In the case of four cameras of a parking system, for example, the cameras may each in turn emit a high-quality image which therefore requires more bandwidth and computing power in a central control unit, while the respective other three cameras each precisely then emit a lower-quality image which is therefore less of a burden in terms of the data rate to be transmitted and/or the processing load.

Part 4 of the policy:

According to this part of the policy, if a plurality of functions or data sinks may be active at the same time and may therefore impose requirements on the central control unit at the same time, provision is made for the requirements be able to be prioritized with regard to which of the requirements is more important than others. Such prioritization can be set and stored in the central control unit using parameter values.

Part 5 of the policy:

In this part of the policy, maximum or upper limits are predefined for the respective utilization of resources and must be taken into account overall. In this case, it is possible to predefine, for example, a maximum bandwidth which must not be exceeded by individual cameras, groups of cameras and/or all cameras overall.

On the basis of the respective specifically defined policy, a process of selecting the detailed image settings (for example with regard to resolution and/or number of colors) and/or compression settings (compression rate or image quality) for the individual cameras can then be carried out. The selection process may in turn be carried out in a plurality of steps:

First step of the selection process (AS1):

In this step, functions or control units requiring image data report their respective requirement (see part 1 of the policy) for a parameter of the policy to the central control unit, for example because a function, for example lane detection, is activated,
  because a particular view is selected for a parking function in a graphical user interface,
  because an object, for example an obstacle and/or a traffic sign, has been detected,
  because another sensor, for example a radar or ultrasonic sensor, has detected objects in a particular image area.

Second step of the selection process (AS2):

In this step, further control components of the vehicle can report variable resource restrictions (see part 5 of the policy). For example, an Ethernet connection may be or have been restricted. in terms of the possible bandwidth of the video or image transmission. on account of a temporary audio transmission.

Third step of the selection process (AS3):

In this step, the presumably best constellation of the requirements is selected. The new data rate is gradually approached from "below". In this case, a simplification can be achieved using prefabricated scenarios with fixed parameter sets which are defined or firmly predefined once as suitable.

Fourth step of the selection process (AS4):

This step is carried out repeatedly and, in particular, continuously or within. predefined repetition intervals, in this case, the selection of the set control parameters is readjusted, possibly regularly or repeatedly, in the case of changing image contents. This takes into account, in particular, the fact that changing image contents generally result in different compression results and therefore in changing bandwidths and compression artifacts. The central. policy can therefore be permanently readjusted if necessary. The transmission of data can therefore be optimized even when the requirements imposed on the image quality temporarily remain constant.

LIST OF REFERENCE SYMBOLS

1 Vehicle
BE Image setting
D_AKT Current data rate
D_DYN Dynamically available data rate
D_G Desired data rate
FN Function
FN_M Set of functions
H Network node
KAM_1 to KAM_4 First to fourth camera
R_DYN Dynamically available computing capacity
SV Control apparatus The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting image data from a camera in a vehicle, the method comprising the acts of:
   providing a set of vehicle functions, each vehicle function performed by one or more vehicle systems of the vehicle using the camera, the camera having a plurality of image settings, wherein the set of vehicle functions comprises:
      a first vehicle function associated with a first image setting, and a second vehicle function associated with a second image setting, wherein the respective performance of each vehicle function requires the camera set to the respective image setting;
   activating the first and/or the second vehicle function from among the set of vehicle functions;
   setting the camera to an image setting corresponding to the activated first and/or second vehicle function, based on the activated first and/or second vehicle function and a predefined desired data rate for transmitting image data, from the camera, in the course of performing the activated first and/or second vehicle function, wherein setting the camera to the image setting is in accordance with a multi-part policy that delineates:
      one or more image setting requirements associated with each vehicle function,
      dynamic data rate changes associated with each of the one or more image setting requirements,
      whether the one or more image setting requirements are to be set for each image, or for each nth image of the camera,
      prioritization of image setting requirements according to active vehicle functions, and
      one or more predefined maximum limits for resource utilization by active vehicle functions,
   wherein a current data rate of the camera is determined, and the image settings are gradually adapted on the basis of the current data rate and on the basis of the predefined desired data rate, starting from a predefined starting data rate which is lower than the predefined desired data rate, and
   wherein the vehicle functions are respectively weighted, and, if more than one vehicle function is activated at the same time, the camera is set to the image setting on the basis of the respective weighting.

2. The method according to claim 1, wherein the image setting of the camera is set on the basis of a dynamically available data rate.

3. The method according to claim 1, wherein the image setting of the camera is set on the basis of a dynamically available computing capacity.

4. The method of claim 1, wherein the respective requirement of the vehicle functions for their respective image setting is dynamic.

5. The method according to claim 1, wherein a current data rate of the camera is determined, and the image settings are adapted on the basis of the current data rate and on the basis of the predefined desired data rate.

6. An apparatus for transmitting image data comprising:
   a network node in a vehicle;
   a camera in the vehicle and coupled to the network node, the camera having a plurality of image settings; and
   a computing unit coupled to the network node, wherein the computing unit is configured to:
      provide a set of vehicle functions, each vehicle function performed by one or more vehicle systems of the vehicle using the camera, wherein the set of vehicle functions comprises:
         a first vehicle function associated with a first image setting, and a second vehicle function associated with a second image setting, wherein the respective performance of each vehicle function requires the camera set to the respective image setting, and
      in response to the first and/or second vehicle function being activated, set the camera to an image setting corresponding to the activated first and/or second vehicle function, based on the activated first and/or second vehicle function and a predefined desired data rate for transmitting image data, from the camera, in the course of performing the activated first and/or second vehicle function, wherein setting the camera to the image setting is in accordance with a multi-part policy that delineates:
         one or more image setting requirements associated with each vehicle function,
         dynamic data rate changes associated with each of the one or more image setting requirements,
         whether the one or more image setting requirements are to be set for each image, or for each nth image of the camera,
         prioritization of image setting requirements according to active vehicle functions, and
         one or more predefined maximum limits for resource utilization by active vehicle functions,
      wherein a current data rate of the camera is determined, and the image settings are gradually adapted on the basis of the current data rate and on the basis of the predefined desired data rate, starting from a predefined starting data rate which is lower than the predefined desired data rate, and
      wherein the vehicle functions are respectively weighted, and, if more than one vehicle function is activated at the same time, the camera is set to the image setting on the basis of the respective weighting.

7. The apparatus according to claim 6, wherein the image setting of the camera is set on the basis of a dynamically available data rate.

8. The apparatus according to claim 6, wherein the image setting of the camera is set on the basis of a dynamically available computing capacity.

9. A vehicle comprising:
   a network node;
   a camera coupled to the network node and configured to transmit image data, the camera having a plurality of image settings; and
   a computing unit coupled to the network node, wherein the computing unit is configured to:
      provide a set of vehicle functions, each vehicle function performed by one or more vehicle systems of the vehicle using the camera, wherein the set of vehicle functions comprises:
         a first vehicle function associated with a first image setting, and a second vehicle function associated with a second image setting, wherein the respective performance of each vehicle function requires the camera set to the respective image setting, and in response to the first and/or second vehicle function being activated, set the camera to an image setting corresponding to the activated first and/or second vehicle function, based on the activated first and/or second vehicle function and a predefined desired data rate for transmitting image data, from the camera, in the course of performing the activated first and/or second vehicle function, wherein setting the camera to the image setting is in accordance with a multi-part policy that delineates:
- one or more image setting requirements associated with each vehicle function,
- dynamic data rate changes associated with each of the one or more image setting requirements,
- whether the one or more image setting requirements are to be set for each image, or for each nth image of the camera,
- prioritization of image setting requirements according to active vehicle functions, and
- one or more predefined maximum limits for resource utilization by active vehicle functions, wherein a current data rate of the camera is determined, and the image settings are gradually adapted on the basis of the current data rate and on the basis of the predefined desired data rate, starting from a predefined starting data rate which is lower than the predefined desired data rate, and wherein the vehicle functions are respectively weighted, and, if more than one vehicle function is activated at the same time, the camera is set to the image setting on the basis of the respective weighting.

10. The vehicle according to claim 9, in which the respective image setting of the camera is set on the basis of a dynamically available data rate.

11. The vehicle according to claim 9, in which the respective image setting of the camera is set on the basis of a dynamically available computing capacity.

12. A non-transitory computer readable medium having computer-executed code embodied therein for transmitting image data from a camera in a vehicle, the camera having a plurality of image settings, the non-transitory computer readable medium having:
- processor executable program code to provide a set of vehicle functions, each vehicle function performed by one or more vehicle systems of the vehicle using the camera, wherein the set of vehicle functions comprises:
  - a first vehicle function associated with a first image setting, and a second vehicle function associated with at second image setting, wherein the respective performance of each vehicle function requires the camera set to the respective image setting, and
- processor executable program code to, in response to the first and/or second vehicle function being activated, set the camera to an image setting corresponding to the activated first and/or second vehicle function, based on the activated first and/or second vehicle function and a predefined desired data rate for transmitting image data, from the camera, in the course of performing the activated first and/or second vehicle function, wherein setting the camera to the image setting is in accordance with a multi-part policy that delineates:
  - one or more image setting requirements associated with each vehicle function,
  - dynamic data rate changes associated with each of the one or more image setting requirements,
  - whether the one or more image setting requirements are to be set for each image, or for each nth image of the camera,
  - prioritization of image setting requirements according to active vehicle functions, and
  - one or more predefined maximum limits for resource utilization by active vehicle functions, wherein a current data rate of the camera is determined, and the image settings are gradually adapted on the basis of the current data rate and on the basis of the predefined desired data rate, starting from a predefined starting data rate which is lower than the predefined desired data rate, and wherein the vehicle functions are respectively weighted, and, if more than one vehicle function is activated at the same time, the camera is set to the image setting on the basis of the respective weighting.

13. The method according to claim 1, wherein the set of vehicle functions comprises at least one of: lane detection, a display of a view predefined by a customer in a parking function, an object detection, an obstacle detection and a traffic sign detection.

14. The method according to claim 1, wherein the respective requirement of the vehicle functions for their respective image setting changes on the basis of a vehicle state.

15. The method according to claim 1, wherein the image settings impose image quality parameters on at least a portion of images captured by the camera.

* * * * *